United States Patent [19]
Aoki et al.

[11] Patent Number: 6,050,632
[45] Date of Patent: *Apr. 18, 2000

[54] SLIDING SHOE FOR SUN ROOF DEVICE

[75] Inventors: Toshihiko Aoki; Masanobu Ohtsu, both of Yokohama; Jun Takahashi, Kanagawa, all of Japan

[73] Assignee: Ohi Seisakusho Co., Ltd., Yokohama, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/919,778

[22] Filed: Aug. 29, 1997

[30] Foreign Application Priority Data

Aug. 30, 1996 [JP] Japan ................................. 8-229767

[51] Int. Cl.[7] .................................................. B60J 7/057
[52] U.S. Cl. ........................................... 296/223; 296/223
[58] Field of Search .................................... 296/221, 222, 296/223

[56] References Cited

U.S. PATENT DOCUMENTS

| | | | |
|---|---|---|---|
| 4,601,512 | 7/1986 | Boots | 296/221 |
| 4,643,478 | 2/1987 | Boots | 296/221 |
| 4,869,548 | 9/1989 | Nagata et al. | 296/221 |
| 4,923,246 | 5/1990 | Takahashi et al. | 296/221 |
| 4,982,995 | 1/1991 | Takahashi | 296/221 |
| 5,028,090 | 7/1991 | Huyer | 296/221 |
| 5,069,501 | 12/1991 | Baldwin et al. | 296/223 |
| 5,707,102 | 1/1998 | Takahashi et al. | 296/223 |

FOREIGN PATENT DOCUMENTS

| | | | |
|---|---|---|---|
| 0 143 589 | 6/1985 | European Pat. Off. . | |
| 0 343 750 | 11/1989 | European Pat. Off. . | |
| 4424509 | 1/1995 | Germany | 296/221 |
| 61-287819 | 12/1986 | Japan | 296/221 |
| 2220926 | 9/1990 | Japan | 296/221 |
| 3121926 | 5/1991 | Japan | 296/221 |
| 4243624 | 8/1992 | Japan | 296/221 |
| 5104956 | 4/1993 | Japan | 296/221 |
| 6-35252 | 5/1994 | Japan . | |
| 2 207 700 | 2/1989 | United Kingdom . | |

*Primary Examiner*—Joseph D. Pape
*Assistant Examiner*—Paul Chenevert
*Attorney, Agent, or Firm*—Foley & Lardner

[57] ABSTRACT

An automotive sun roof device comprises a roof opening, a lid sized to cover the roof opening, a guide rail extending along a side of the roof opening, and a bracket secured to the lid. A sliding shoe is slidably engaged with the guide rail. The sliding shoe includes first and second wall members which are coupled having a clearance defined therebetween. The first and second wall members have in mutually facing inner surfaces thereof first and second guide tracks. At least one of the first and second guide tracks is of a bottomed groove. A lifting arm has a lower portion movably inserted into the clearance between the first and second wall members. The lower portion has at opposed surfaces thereof first and second guided pins which are operatively engaged with the first and second guide tracks. A pivot pin is used for pivotally connecting an upper portion of the lifting arm to the bracket.

16 Claims, 5 Drawing Sheets

SLIDING SHOE FOR SUN ROOF DEVICE

BACKGROUND OF THE INVENTION

1. Field of the Invention

The present invention relates in general to sun roof devices for wheeled motor vehicles, and more particularly to sun roof devices of a type which generally comprises a pair of guide rails extending along respective sides of a roof opening, two pairs of front and rear sliding shoes slidably engaged with the guide rails, lifting arms carried by the rear sliding shoes, and a lid having a front portion carried by the front sliding shoes and a rear portion carried by the lifting arms. More specifically, the present invention is concerned with an improvement in construction of the rear sliding shoe.

2. Description of the Prior Art

In order to clarify the task of the present invention, one of conventional sun roof devices will be described, which is shown in Japanese Patent Second Provisional Publication 6-35252.

The sun roof device of the publication comprises a pair of guide rails which extend along respective sides of a rectangular opening formed in a roof, two pairs of front and rear sliding shoes which are slidably engaged with the guide rails respectively, lifting arms which are respectively carried by the rear sliding shoes and a rectangular lid which has a front portion carried by the front sliding shoes and a rear portion carried by the lifting arms.

In response to movement of the front and rear sliding shoes along the guide rails with an electric power, the lid is brought to four essential positions, which are a tilt-up position wherein the lid is placed in the roof opening with its rear end somewhat raised from a rear end of the roof opening, a full-close position wherein the lid is neatly received in the roof opening to fully close the same, a tilt-down position wherein the lid is placed in the roof opening with its rear end somewhat lowered from the rear end of the roof opening and a full-open position wherein the lid is drawn rearward and received in a lid containing space of the roof thereby to fully open the roof opening.

To permit the lid to take the above-mentioned positions, each rear sliding shoe and the corresponding lifting arm are constructed and arranged in the following manner.

The rear sliding shoe is of a single-block structure constructed of an aluminum die-cast and comprises mutually spaced first and second guide walls which have respectively first and second guide slots. The lifting arm has at opposed surfaces thereof first and second guided pins which are slidably engaged with the first and second guide slots of the rear sliding shoe. That is, due to movement of the first and second guided pins in the respective guide slots, the lid is moved to take the tilt-up, full-close and tilt-down positions.

In order to put the first and second guided pins into the first and second guide slots upon assembly of the shoe, one of the first and second guide walls is formed with a leading slot which is led to one of the first and second guide slots. After the first and second guided pins are brought into engagement with the first and second guide slots with an aid of the leading slot, the leading slot is covered with a cover plate. The cover plate is fixed to the corresponding guide wall by means of bolts.

However, due to inherent construction, the above-mentioned rear sliding shoe has the following drawbacks.

First, due to provision of the guide slots in the first and second guide walls, the mechanical strength of the sliding shoe is poor. One measure for solving this problem is to increase the thickness of each guide wall of the shoe. However, increase in thickness tends to induce a bulky, heavy and expensive construction of the sliding shoe and thus that of the entire of the sun roof device.

Second, due to provision of the guide slots in the guide walls, the guided pins are easily viewed from the outside of the shoe, which lowers the aesthetic value of the sun roof device.

Third, due to provision of the cover plate with which the leading slot is covered, there is inevitably produced a gap between the cover plate and a wall of the corresponding guide slot. The gap tends to cause generation of a noise when the corresponding guided pin abuts against the same during operation of the lifting arm.

SUMMARY OF THE INVENTION

It is therefore an object of the present invention to provide a sliding shoe which is free of the above-mentioned drawbacks.

According to a first aspect of the present invention, there is provided a combination in an automotive sun roof device which includes a roof opening, a lid sized to cover the roof opening, a guide rail extending along a side of the roof opening, and a bracket secured to the lid. The combination comprises a sliding shoe slidably engaged with the guide rail, the sliding shoe including first and second wall members which are coupled having a clearance defined therebetween, the first and second wall members having in mutually facing inner surfaces thereof first and second guide tracks, the first guide track being of a bottomed groove; a lifting arm having a lower portion movably inserted into the clearance, the lower portion having at opposed surfaces thereof first and second guided pins which are operatively engaged with the first and second guide tracks; and pivot means for pivotally connecting an upper portion of the lifting arm to the bracket.

According to a second aspect of the present invention, there is provided a sliding shoe for use in an automotive sun roof device, which comprises a first wall member having in one surface thereof a first guide track; a second wall member having one surface thereof a second guide track; and coupling means for coupling the first and second wall members in such a manner that the surfaces face each other with a certain clearance therebetween, wherein at least one of the first and second guide tracks is of a bottomed groove.

BRIEF DESCRIPTION OF THE DRAWINGS

Other objects and advantages of the present invention will become apparent from the following description when taken in conjunction with the accompanying drawings, in which:

FIG. 7 is schematic sectional view of an automotive sun roof device to which the sliding shoe of the present invention can be applied to.

DETAILED DESCRIPTION OF THE INVENTION

Figure 1:
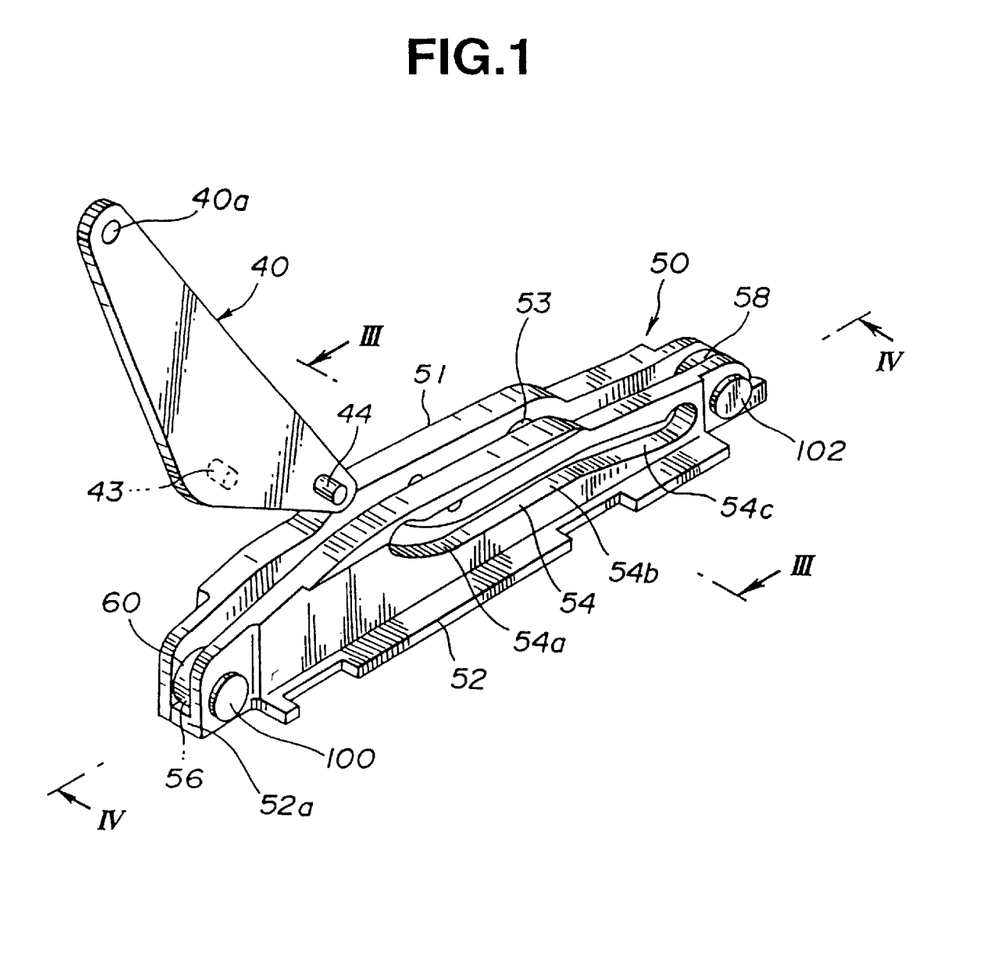
FIG. 1 is a perspective view of a sliding shoe of the present invention and a lifting arm which is incorporated therewith.

Referring to FIGS. 1 to 7 of the drawings, particularly, FIG. 1, there is shown a rear sliding shoe according to the present invention, which is generally denoted by numeral 50.

Figure 2:
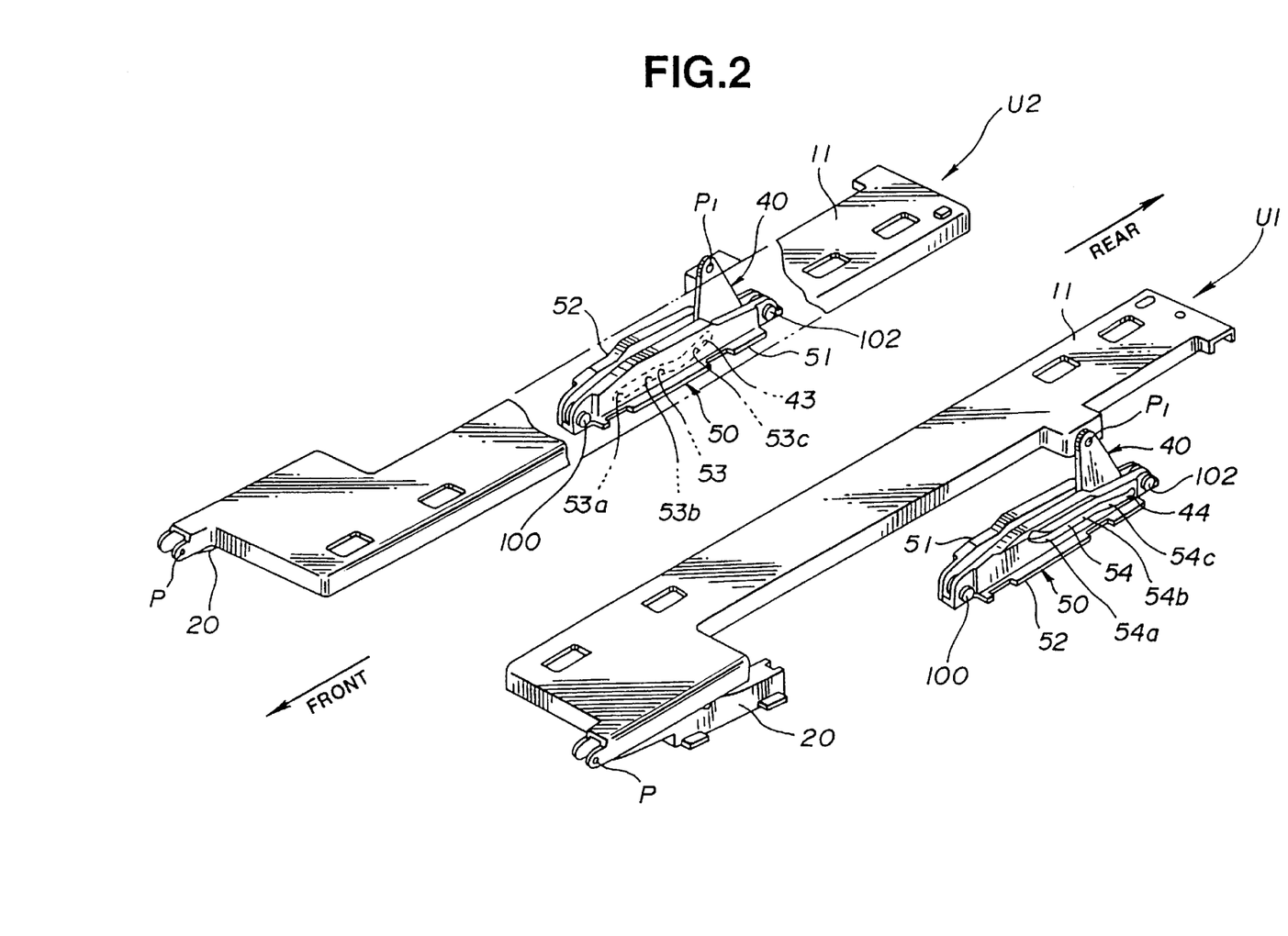
FIG. 2 is a perspective view of a pair of lid carrying units which constitute an essential part of a sun roof device, each lid carrying unit having the sliding shoe of the invention incorporated therewith.

As is understood from FIG. 2, the sliding shoe 50 of the invention is used as a rear sliding shoe incorporated with each lid carrying unit "U1" or "U2".

For clarifying the function and construction of the rear sliding shoe 50, the two lid carrying units "U1 and U2" shown in FIG. 2 will be briefly described in the following.

The two lid carrying units "U1 and U2" carry thereon a lid 10 by which a roof opening 12 is closed and opened. That is, the two units "U1 and U2" are respectively secured to lateral sides of a lower surface of the lid.

Since the two units "U1 and U2" are substantially the same in construction, only the unit "U1" will be described. In fact, these two units "U1 and U2" are arranged symmetrical with respect to a center line axially extending along a space defined therebetween. More specifically, these units "U1" and "U2" are substantially mirror-image units.

The lid carrying unit "U1" comprises an elongated bracket 11 which is secured, by bolts or the like, to the lateral side of the lower surface of the lid. A front sliding shoe 20 is pivotally connected to a front portion of the bracket 11 through a pivot pin "P", and the rear sliding shoe 50 of the invention is pivotally connected to a rear portion of the bracket 11 through a lifting arm 40 and a pivot pin "P1". These front and rear sliding shoes 20 and 50 are aligned to be slidably engaged with a guide rail 14 which extends along a lateral side of the sun roof opening.

As is seen from FIG. 1, the rear sliding shoe 50 of the invention comprises generally two separate major parts, which are first and second wall members 51 and 52 which are coupled by means of coupling pins 100 and 102 as will be described in detail hereinafter. Each wall member 51 or 52 is constructed of a die-cast. However, as will be described hereinafter, these wall members 51 and 52 may be produced by pressing or punching metal plates.

As can be understood from FIG. 2, when the rear sliding shoe 50 is properly assembled in a sun roof device, the first wall member 51 is positioned in an inner side facing the vehicle cabin and the second wall member 52 is positioned in an outer side facing the outside of the vehicle.

Figure 3:
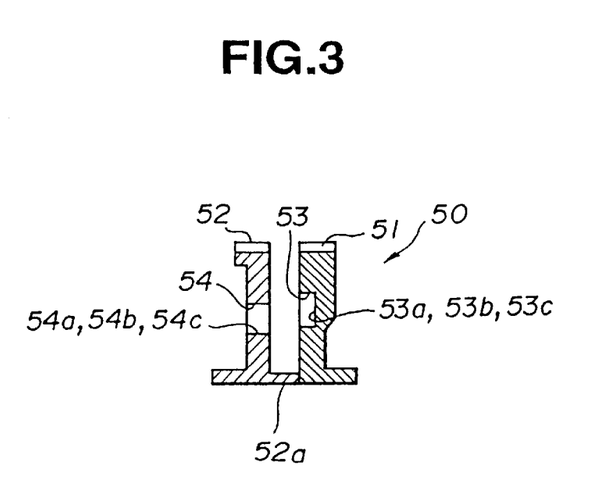
FIG. 3 is a sectional view taken along the line III—III of FIG. 1.

As is seen from FIG. 3, the second wall member 52 has along a lower end thereof a bottom wall part 52a which extends laterally outward. That is, when the first and second wall members 51 and 52 are properly assembled, the bottom wall part 52a extends to a lower portion of the first wall member 52 to define a certain flat clearance between the first and second wall members 51 and 52, as shown. The first wall member 51 is formed at an inner surface thereof with a first guide track 53, while, the second wall member 52 is formed with a second guide track 54.

It is to be noted that the first guide track 53 is a groove or bottomed groove (viz., not a through slot) formed in the inner surface of the first wall member 51, and the second guide track 54 is a slot formed through the second wall member 52. However, if desired, the second guide track 54 may be a groove formed in an inner surface of the second wall member 52.

As will be apparent hereinafter, a lower portion of the lifting arm 40 is movably inserted into the flat clearance defined by the first and second wall members 51 and 52.

As is seen from FIG. 1, the first and second wall members 51 and 52 are coupled by means of the front and rear coupling pins 100 and 102. The front coupling pin 100 passes through mated openings respectively formed in front ends of the first and second wall members 51 and 52, and the rear coupling pin 102 passes through mated openings respectively formed in rear ends of the first and second wall members 51 and 52.

Figure 4:
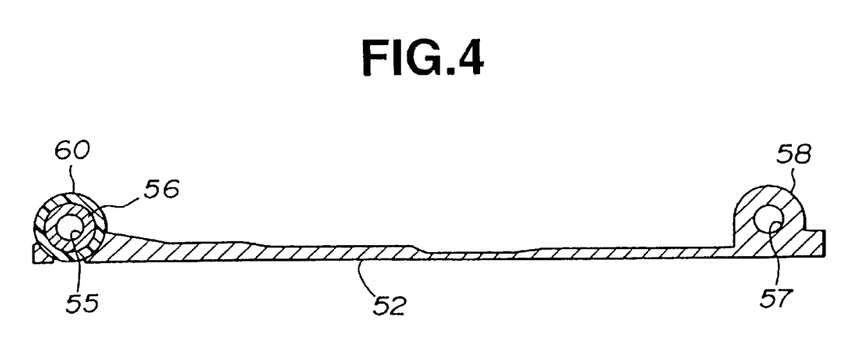
FIG. 4 is a sectional view taken along the line IV—IV of FIG. 1.
Figure 6:
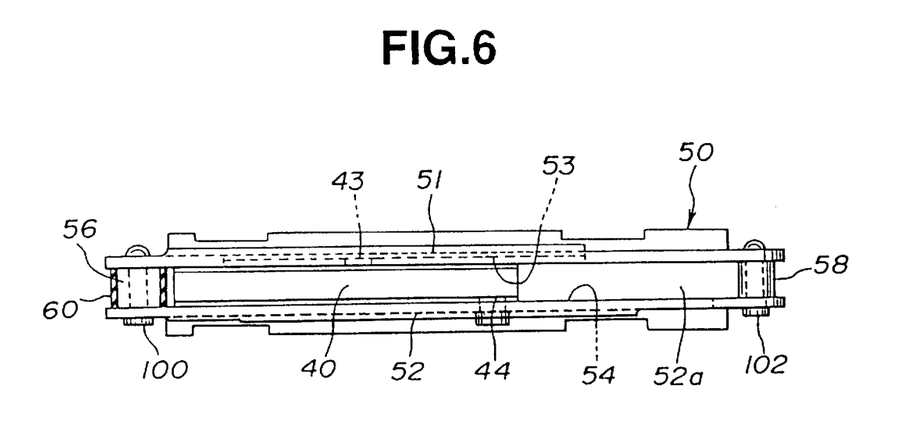
FIG. 6 is a top view of the sliding shoe of the present invention.
Figure 7:
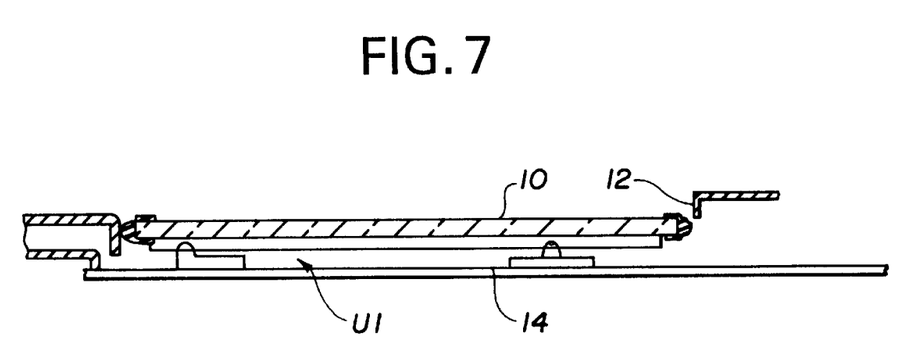

As is seen from FIGS. 4 and 6, the second wall member 52 is integrally formed at its front and rear ends with circular bosses 56 and 58 respectively which project laterally. As is seen from FIG. 1, upon assembly of the sliding shoe 50, each boss 56 or 58 of the second wall member 52 abuts at a flat end with the inner surface of the first wall member 51. Each boss 56 or 58 has a center opening 55 or 57 through which the coupling pin 100 or 102 passes.

As is seen from FIGS. 1, 4 and 6, the front boss 56 of the second wall member 52 has an elastic annular member 60 disposed thereabout. As will become apparent hereinafter, the elastic annular member 60 serves as a stopper for restricting a forwardly inclined position of the lifting arm 40.

As is seen from FIG. 1 the lifting arm 40 is generally triangular in shape. The arm 40 is provided at its lower portion with first and second guide pins 43 and 44 which project in opposite directions from opposed surfaces. As shown, these pins 43 and 44 are spaced in a fore-and-aft direction. That is, the first pin 43 is positioned near an obtuse-angled apex of the triangular lifting arm 40, the second pin 44 is positioned near an acute-angled lower apex of the arm 40 and an opening 40a for the pivot pin "P1" is positioned near an acute-angled upper apex of the arm 40, as shown. The pivot pin "P1" and the first and second pins 43 and 44 constitute a so-called three point supporting structure.

Upon assembly, the lower portion of the lifting arm 40 is received in the flat clearance between the first and second wall members 51 and 52 having the first guided pin 43 slidably engaged with the first guide track 53 and the second guided pin 44 slidably engaged with the second guide track 54. To allow a pivotal movement of the lifting arm 40 relative to the fixed first and second wall members 51 and 52, the thickness of the flat clearance is somewhat larger than that of the lifting arm 40.

Figure 5:
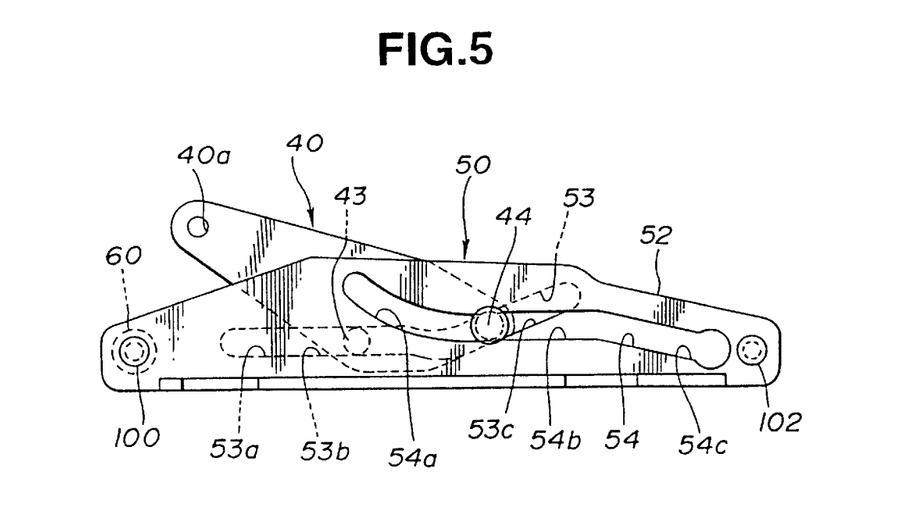
FIG. 5 is a side view of the sliding shoe of the present invention.

As is understood from FIG. 5, the first guide track 53 comprises a horizontal front part 53a, a horizontal middle part 53b extending rearward from the front part 53a and a sloped rear part 53c extending rearward upwardly from the middle part 53b.

When the first guided pin 43 is in the horizontal front part 53a, the lid assumes the tilt-down position. When the pin 43 is in the horizontal middle part 53b, the lid assumes the full-close position. While, when the pin 43 is in the sloped rear part 53c, the lid assumes the tilt-up position.

The second guide track 54 comprises a front-raised sloped front part 54a, a generally horizontal middle part 54b extending rearward from the front part 54a and a rear-raised sloped rear part 54c extending rearward from the middle part 54b. As is seen from the drawing, when viewed from a lateral side of the sliding shoe 50, the second guide track 54 is laterally offset from the first guide track 53 so that second guide track is positioned further to the rear than the first track 53. That is, the sloped front part 54a of the second guide track 54 is positioned above the middle part 53b of the first guide track 53, and the middle part 54b of the second guide track 54 is positioned to extend across a lower portion of the sloped rear part 53c of the first guide track 53.

When the lid assumes the tilt-down position, the second guided pin 44 is in the sloped front part 54a. When the lid assumes the full-close position, the pin 44 is in the horizontal middle part 54b. While, when the lid assumes the tilt-up position, the pin 44 is in the sloped rear part 54c.

That is, the lifting arm 40 assumes three angular positions relative to the sliding shoe 50, which are a retracted position taken when the lid assumes the tilt-down position, a neutral position taken when the lid assumes the full-close position and a raised position take when the lid assumes the tilt-up position.

Although not shown in the drawings, the sliding shoe 50 is driven forward and rearward by a geared cable which is slidably received in a cable guide groove formed in the guide rail. The geared cable is driven by a reversible electric motor mounted on the vehicle roof. The motor is controlled by a manual switch located in the vehicle cabin.

In order to assemble the sliding shoe 50 and the lifting arm 40, the following steps are taken.

First, the first and second wall members 51 and 52 are loosely joined putting therebetween the lower portion of the lifting arm 40. Then, the first and second pins 43 and 44 are brought into engagement with the first and second guide tracks 53 and 54 respectively. Then, with the pins 43 and 44 kept engaged with the guide tracks 53 and 54, the two wall members 51 and 52 are trued up having the circular bosses 56 and 58 of the second wall member 52 tightly put on proper positions of the first wall member 51. It is to be noted that the elastic annular member 60 is a front given space defined between the wall members first slipped over the boss 56 before the first and second wall members 51 and 52 are assembled together. The elastic annular member 60 thus occupies 51 and 52. After the first and second wall members 51 and 52 are aligned, the coupling pins 100 and 102 are thrust into the front and rear openings of the mated two wall members 51 and 52 having the coupling pin 100 passed through the elastic annular member 60. Then, the two coupling pins 100 and 102 are caulked, i.e., riveted or deformed to enlarge the portion of the pins 100 and 102 protruding from the first wall member 51, as shown in FIG. 6, to tightly couple the two wall members 51 and 52.

The rear sliding shoe 50 having the above-mentioned construction is connected to the elongate bracket 11 by means of the pivot pin "P1" as have been described hereinafore. That is, for this connection, as is shown in FIG. 2, the pivot pin "P1" passing through the opening 40a (see FIG. 1) of the lifting arm 40 is secured to the rear portion of the bracket 11.

In the following, with an aid of FIGS. 2 and 5, operation of the rear sliding shoe 50 of the present invention will be described with respect to that of the associated sun roof device.

For ease of understanding, the explanation will be commenced with respect to the tilt-up condition of the lid. As has been mentioned hereinafore, in this condition, the lid is placed in the roof opening with its rear somewhat raised from the rear end of the roof opening. That is, each lid carrying unit "U1" or "U2" assumes the frontmost position of the guide rail causing the lifting arm 40 of the rear sliding shoe 50 to assume the raised position. That is, under this condition, the first guided pin 43 of the lifting arm 40 is in the sloped rear part 53c of the first guide track 53 of the first wall member 51, and the second guided pin 44 of the lifting arm 40 is in the sloped rear part 54c of the second guide track 54 of the second wall member 52.

When, due to rearward movement of the geared cable, the rear sliding shoe 50 is pulled rearward to a certain position, the two pins 43 and 44 are moved forward in the corresponding grooves 53 and 54 causing the lifting arm 40 to assume the neutral position. During this, period the lid is pivoted down from the tilt-up position to the full-close position to fully close the roof opening. Under this condition, the first guided pin 43 is in the horizontal middle part 53b of the first guide track 53 and the second guided pin 44 is in the horizontal middle part 54b of the second guide track 54.

When, due to further movement of the geared cable, the rear sliding shoe 50 is further moved rearward, the two pins 43 and 44 are moved further forward in the corresponding grooves 53 and 54 causing the lifting arm 40 to assume the retracted position wherein a front edge of the lifting arm 40 softly abuts on the elastic annular member 60. Due to this movement, the lid is pivoted down from the full-close position to the tilt-down position. In this tilt-down position, the first guided pin 43 is in the horizontal front part 53a of the first guide track 53 and the second guided pin 44 is in the sloped front part 54a of the second guide track 54. Thus, when the rear sliding shoe 50 is further pulled rearward by the geared cable, the lid is finally slid into the lid containing space of the roof to fully open the roof opening.

In the following, advantages of the sliding shoe 50 of the present invention will be described.

First, since at least one of the first and second guide tracks 53 and 54 is a bottomed groove (viz., not a through slot), the sliding shoe 50 can possess or keep a satisfied mechanical strength. Of course, if both the guide tracks 53 and 54 are of the bottomed groove, the mechanical strength of the shoe 50 is much assured.

Second, due to the dividable construction of the sliding shoe 50, it is very easy to connect the lifting arm 40 to the sliding shoe 50. Furthermore, for the same reason, it is easy to die-cast the parts (viz., the first and second wall members 51 and 52) of the sliding shoe 50. In fact, each part has a simple structure as compared with the above-mentioned conventional sliding shoe of a single-block structure.

Third, since the first guide track 53 of the first or inside guide member 51 is of the bottomed groove, the unsightly pin 43 of the lifting arm 40 is not viewed from the interior of the vehicle cabin, which improves the aesthetic value of the sun roof device.

Fourth, since the lifting arm 40 can be easily connected to the sliding shoe 50 as is mentioned hereinabove, there is no need of providing the wall member 51 or 52 with a pin leading slot which has been provided in the above-mentioned conventional sliding shoe. This solves the noise problem which would occur in the conventional sliding shoe show when the pin abuts against a cover plate which is inevitably provided to cover the leading slot.

Although the above-description is directed to the sliding shoe 50 which substantially consists of die-cast parts, the sliding shoe of the present invention may consist of pressed or punched metal plates. In this case, the first guide track 53 (viz., bottomed groove) and the second guide track 54 (viz., slot) are easily produced. For spacing the first and second wall members, separate metal collars can be used in place of the above-mentioned circular bosses 56 and 58 which are integral with the second wall member 52. Of course, such metal collars may be replaced with inwardly projected boss portions pressed out of one of the wall members.

What is claimed is:

1. An automotive sun roof device for a vehicle having a roof with an opening having two sides extending in a fore and aft direction of the vehicle, the automotive sun roof device comprising:

a lid sized to cover the roof opening;

a guide rail extending along each side of the roof opening;

a bracket secured to said lid and movable with the lid;

a sliding shoe slidably engaged with the guide rail, said sliding shoe comprising a first wall member and a second wall member fixedly coupled together with no relative displacement therebetween, and having a clearance defined therebetween, said first and second wall members having at mutually facing inner surfaces thereof, first and second guide tracks, at least said first guide track being comprised of a groove extending along the entirety thereof; and a lifting arm having a lower portion slidably mounted to said first and second guide tracks, and an upper portion pivotally connected to said bracket, said lower portion having at opposed surfaces thereof, first and second guided pins that slidably engage said first and second guide tracks.

2. An automotive sun roof device as claimed in claim 1, wherein said first wall member having the first guide track is adapted to be placed and arranged to face an interior of a vehicle cabin.

3. An automotive sun roof device for a vehicle having a roof with an opening having two sides extending in a fore and aft direction of the vehicle, the automotive sun roof device comprising:

a lid sized to cover the roof opening;

a guide rail extending along each side of the roof opening;

a bracket secured to said lid and movable with the lid;

a sliding shoe slidably engaged with the guide rail, said sliding shoe comprising a first wall member and a second wall member fixedly coupled together with no relative displacement therebetween, and having a clearance defined therebetween, said first and second wall members having at mutually facing inner surfaces thereof, first and second guide tracks, at least said first guide track comprising, a groove; and a lifting arm having a lower portion slidably mounted to said first and second guide tracks, and an upper portion pivotally connected to said bracket, said lower portion having at opposed surfaces thereof, first and second guided pins that slidably engage said first and second guide tracks, wherein said sliding shoe includes an elastic member against which a part of said lifting arm abuts when said lifting arm assumes a certain position relative to said sliding shoe.

4. An automotive sun roof device as claimed in claim 3, wherein said second wall member has a front boss and a rear boss that abut the inner surface of said first wall member to define said clearance between the first and second wall members.

5. An automotive sun roof device as claimed in claim 4, wherein said elastic member is annular and is disposed on one of said front and rear bosses for softly supporting a part of said lifting arm when the arm assumes a certain retracted position relative to said sliding shoe.

6. An automotive sun roof device as claimed in claim 4, wherein said sliding shoe further includes two coupling pins that fixedly couple said first and second wall members.

7. An automotive sun roof device as claimed in claim 6, wherein said first wall member has a front opening at a front end thereof and a rear opening at a rear end thereof, and said second wall member has a front opening at a front end thereof, which is aligned with said front opening of said first wall member, and a rear opening at a rear end thereof, which is aligned with said rear opening of said first wall member, wherein each of said coupling pins passes through either the front or rear aligned openings said first and second wall members.

8. An automotive sun roof device as claimed in claim 7, wherein each coupling pin is caulked to tightly couple the first and second wall members.

9. An automotive sun roof device as claimed in claim 1, wherein each of said first and second wall members of the sliding shoe is constructed of aluminum die-cast.

10. An automotive sun roof device as claimed in claim 1, wherein each of said first and second wall members of the sliding shoe is constructed of a pressed metal plate.

11. An automotive sun roof device for a vehicle having a roof with an opening having two sides extending in a fore and aft direction of the vehicle, the automotive sun roof device comprising:

a lid sized to cover the roof opening;

a guide rail extending along each side of the roof opening;

a bracket secured to said lid and movable with the lid;

a sliding shoe slidably engaged with the guide rail, said sliding shoe comprising a first wall member and a second wall member fixedly coupled together with no relative displacement therebetween, and having a clearance defined therebetween, said first and second wall members having at mutually facing inner surfaces thereof, first and second guide tracks, at least said first guide track being comprised of a groove extending along the entirety thereof;

a lifting arm having a lower portion slidably mounted to said first and second guide tracks, and an upper portion pivotally connected to said bracket, said lower portion having at opposed surfaces thereof, first and second guided pins that slidably engage said first and second guide tracks, wherein each of said first and second wall members of the sliding shoe is constructed of a pressed metal plate, and wherein said first and second wall members are spaced from each other by metal members interposed therebetween.

12. An automotive sun roof device as claimed in claim 11, wherein said metal members are inwardly projected boss portions pressed out of one of said first and second wall members.

13. A sliding shoe for an automotive sun roof device, the sliding shoe comprising:

a first wall member having a first guide track;

a second wall member having a second guide track;

coupling means for coupling said first and second wall members so that said first and second wall members are spaced apart with a clearance therebetween, with said first and second guide tracks facing each other, and fixedly coupling the first and second wall members with no relative displacement therebetween;

a lifting arm having a lower portion slidably mounted to said first and second guide tracks, and an upper portion adapted to pivotally connect to a bracket secured to a lid of the sun roof device, said lower portion having at opposed surfaces thereof, first and second guided pins that slidably engage said first and second guide tracks;

an elastic member against which a part of said lifting arm abuts when said lifting arm assumes a certain position relative to said sliding shoe, wherein at least one of said first and second guide tracks comprises a groove.

14. A sliding shoe as claimed in claim 13, wherein said second wall member has a front boss and a rear boss that abut the inner surface of said first wall member to define said clearance between the first and second wall members.

15. A sliding shoe as claimed in claim 14, wherein said elastic member is annular and is disposed on one of said front and rear bosses.

16. A sliding shoe as claimed in claim 15, wherein said coupling means comprises two coupling pins, each coupling being caulked for achieving a tight coupling between the two wall members.

* * * * *